No. 808,929. PATENTED JAN. 2, 1906.
P. A. KETTERING.
AUTOMATIC GAS DANGER SIGNAL.
APPLICATION FILED MAY 31, 1904. RENEWED JUNE 6, 1905.
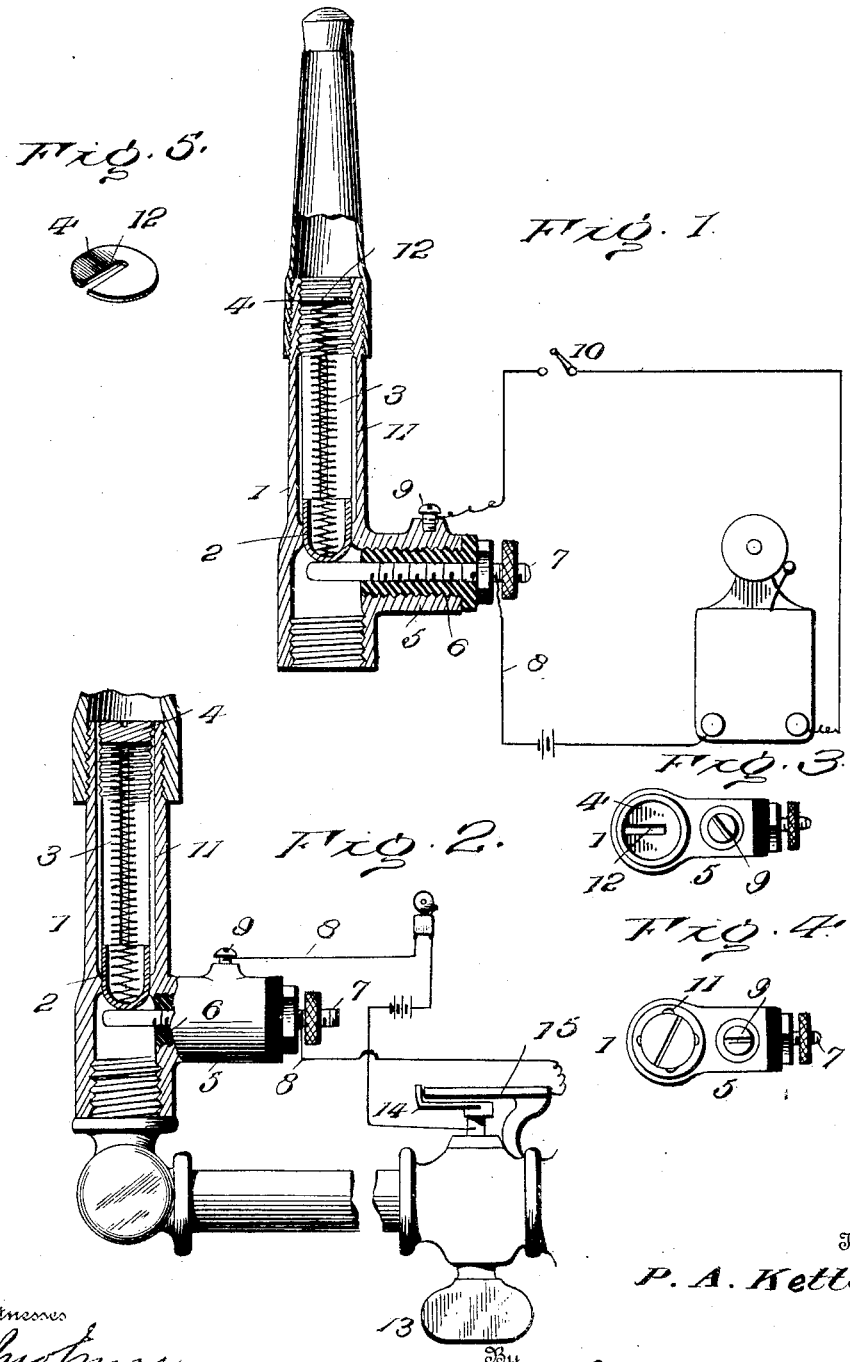
Inventor
P. A. Kettering

UNITED STATES PATENT OFFICE.

PRESTON A. KETTERING, OF CADIZ, OHIO.

AUTOMATIC GAS DANGER-SIGNAL.

No. 808,929.           Specification of Letters Patent.           Patented Jan. 2, 1906.

Application filed May 31, 1904. Renewed June 6, 1905. Serial No. 264,015.

*To all whom it may concern:*

Be it known that I, PRESTON A. KETTERING, a citizen of the United States, residing at Cadiz, in the county of Harrison and State of Ohio, have invented certain new and useful Improvements in Automatic Gas Danger-Signals, of which the following is a specification.

In systems utilizing fluids and liquids supplied continuously from a source, whether artificial or natural, it is desirable to give warning when the pressure falls short of an operative point or ceases entirely, as by stoppage of the flow from any cause, so that the outlets or valves in the line of piping may be closed to prevent the escape of the fluid or liquid when the pressure is reëstablished within the piping.

The invention is designed most especially for gas burners or fixtures to give warning when the flame has become extinguished by a diminished pressure or sudden stoppage of the flow of gas, so that the outlets may be closed. Hence it is shown in this connection in the accompanying drawings.

One of the essential features of the invention is the means devised for adapting the invention to varying pressures and the novel switch for opening and closing the electric alarm-circuit, all as will appear more fully hereinafter.

In the accompanying drawings, forming a part of the specification, Figure 1 is a sectional detail of a regulator embodying the invention, showing an electric alarm-circuit in connection therewith. Fig. 2 is a view similar to Fig. 1, showing the switch for opening and closing the electric circuit controlled by means of the key and illustrating a modification. Fig. 3 is a top plan view of the regulator shown in Fig. 1. Fig. 4 is a top plan view of the regulator illustrated in Fig. 2. Fig. 5 is a detail perspective view of the disk nut employed in the preferred construction for regulating the tension of the valve-operating spring.

Corresponding and like parts are referred to in the following description and indicated in all the views of the drawings by the same reference characters.

The body of the regulator is indicated at 1 and is hollow and receives the valve 2, spring 3, and nut 4. A coupling 5 projects laterally from the hollow body 1 and receives a plug 6, of suitable insulating material, such as vulcanized rubber, compressed paper, or other material commonly employed in electrical apparatus for insulating metal parts. A pin 7 is fitted in the plug 6 and projects into the hollow body 1 across the path of the valve 2, so as to limit its downward movement. The outer end of the pin 7 is adapted to have one end of the electric wire 8 connected thereto. The opposite end of the electric wire 8 is connected to the coupling 5 by means of the clamp-screw 9. A switch 10 is located in the electric circuit represented by the conducting-wire 8, so as to open said circuit when the valve or outlet is normally closed, thereby preventing the continuous sounding of the alarm. One or more grooves 11 are formed in the inner wall of the hollow body and act as passages to convey the liquid or fluid around the valve 2 when the latter is moved upward by the pressure within the piping to which the regulator may be fitted. When the valve 2 is in contact with the inner end of the pin 7, as indicated in Figs. 1 and 2, the lower ends of the grooves 11 are closed, thereby preventing the escape of any fluid or liquid when the pressure falls below a given point even though the outlet is not immediately closed by operating the usual key or cut-off valve. The hollow body is internally threaded to receive the nut 4, by means of which the tension of the spring 3 may be varied to suit different pressures in various localities or according to a selected pressure. The disk nut (shown in Figs. 1 and 5) is provided with a slot 12, which affords an escape for the fluid or liquid, as well as enabling a screw-driver or like tool being used to turn the nut when it is required to vary the tension of the spring 3. As shown in Fig. 1, the grooves 11 begin at a point above the pin 7 and terminate a short distance from the nut 4—hence the necessity for having said nut provided with the slot 12 or otherwise constructed to admit of the fluid or liquid passing thereby.

In the construction shown in Fig. 2 the nut 4 is solid, and grooves 11 extend to the upper end of the body 1, so that the fluid or liquid may pass by the nut 4. The key or valve for closing the outlet is indicated at 13, and one member of the switch, as 14, is connected with the key 13, so as to move therewith, and the other member 15 of the switch is connected to the fixture in any manner. In this construction the switch is operated automatically and simultaneously with the key or valve 13, so that the opening of the key closes the switch and the closing of said key or valve opens the switch, thereby obviating the necessity of two operations, as would be required by having the switch 10 independent of the key or valve 13.

The valve 2 is comparatively light, being hollow and constructed of a metal blank pressed into cup form, substantially as shown. The spring 3 is exceedingly light and delicate, so as to admit of upward movement of the valve 2 by comparatively light pressure when required. For heavy pressure the tension of the spring 3 may be increased or a stouter spring substituted, as will be readily comprehended. The valve 2 snugly fits within the hollow body, and when arrested in its downward movement by the pin 7 it closes the grooves or passages 11. When the switch 10 is closed and the valve is in contact with or supported by means of the pin 7, the alarm-circuit is closed and the signal sounded, thereby giving warning of the reduced pressure or the shutting off of the fluid or liquid from the line of piping to which the regulator is fitted.

Having thus described the invention, what is claimed as new is—

1. In a pressure-alarm, the combination of a hollow body having a passage for the fluid or liquid, an electric alarm-circuit, a pin forming one terminal of said circuit and extending into the hollow body, a valve mounted to reciprocate within the hollow body and to close the aforesaid passage thereof and constituting in effect the other terminal of the alarm-circuit to close the same under abnormal conditions by coming in contact with the said pin, the latter also serving to support the valve and limit its downward movement and a spring for normally holding said valve in contact with the pin, substantially as set forth.

2. In a pressure-alarm, the combination of a hollow body having a passage for the fluid or liquid, an electric alarm-circuit, a pin forming one terminal of said circuit and extending into the hollow body, a valve mounted to reciprocate within the hollow body and to close the aforesaid passage thereof and constituting in effect the other terminal of the alarm-circuit to close the same under abnormal conditions by coming in contact with the said pin, a spring for normally holding said valve in contact with the pin, and a disk nut having screw-thread connection with the hollow body for regulating the tension of said spring and having an opening for reception of a tool and to provide an escape, substantially as set forth.

In testimony whereof I affix my signature in presence of two witnesses.

PRESTON A. KETTERING. [L. S.]

Witnesses:
R. H. MINTEER,
J. G. COIL.